Patented July 16, 1946

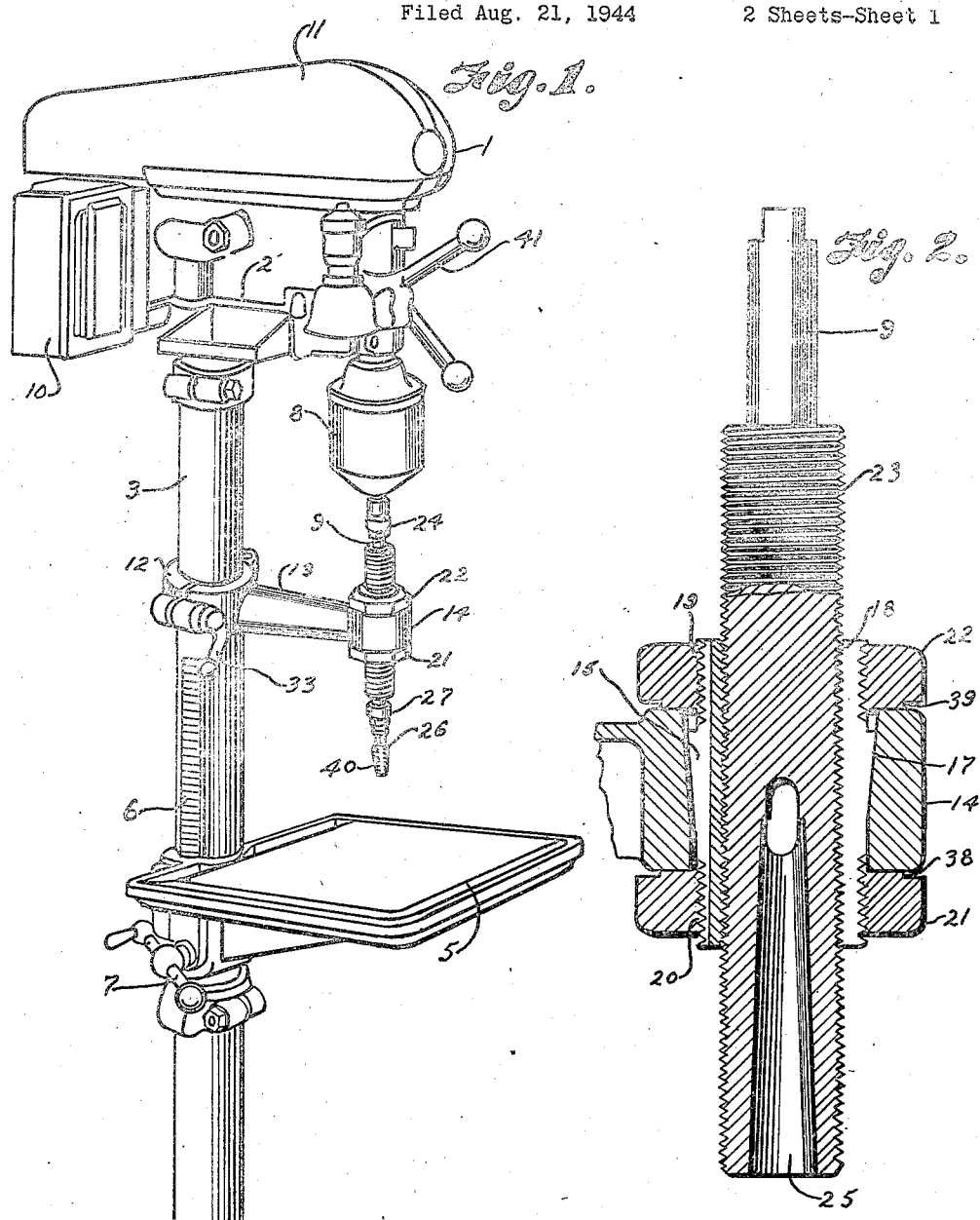
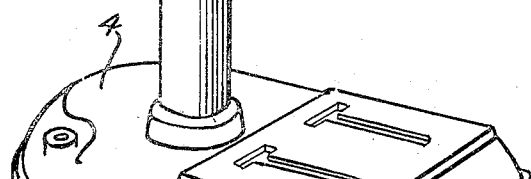

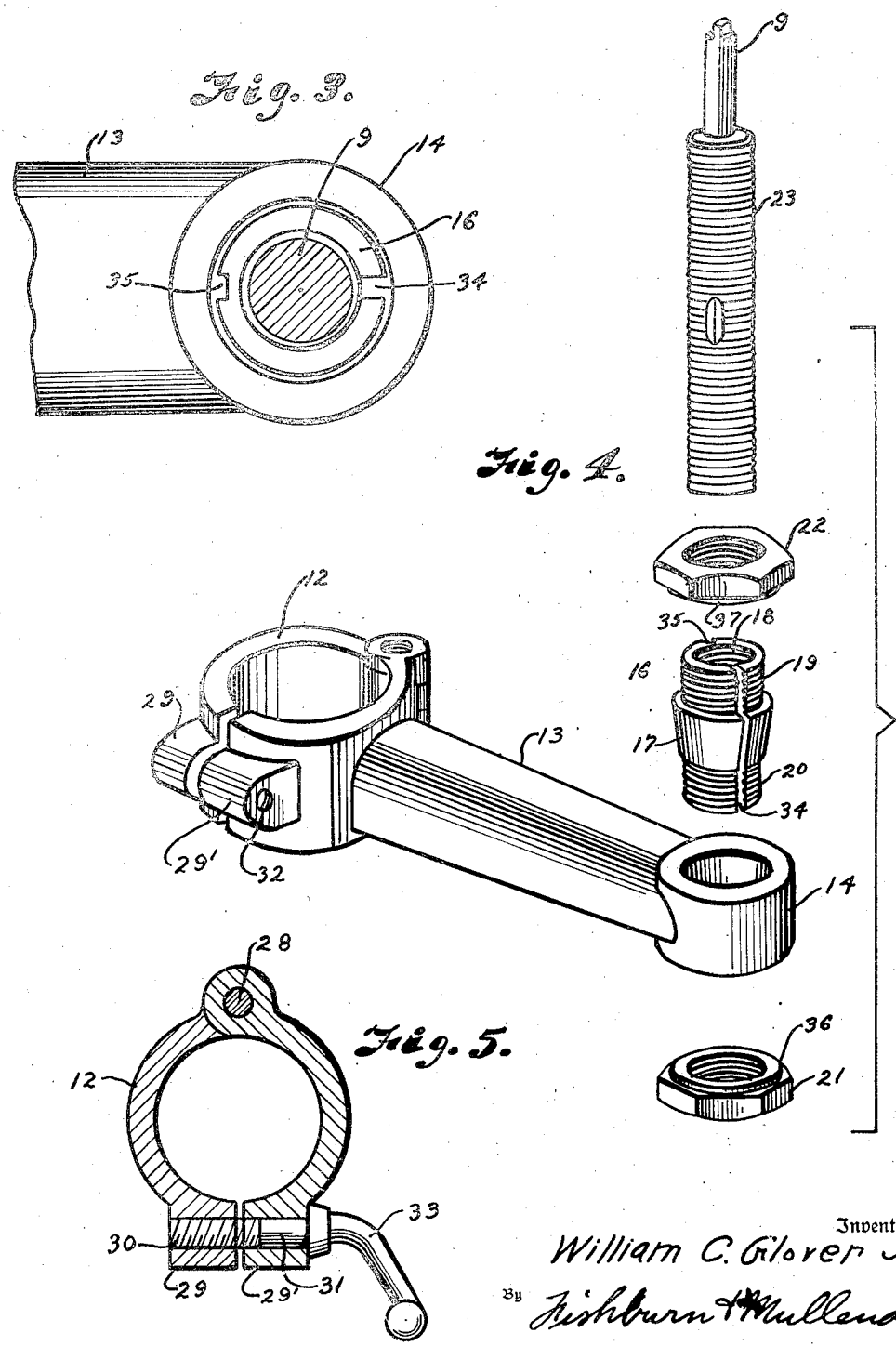

2,404,053

UNITED STATES PATENT OFFICE 2,404,053

THREADING REGULATOR FOR DRILL PRESSES

William C. Glover, Jr., Lee's Summit, Mo.

Application August 21, 1944, Serial No. 550,348

11 Claims. (Cl. 10—136)

This invention relates to machine tools, and more particularly to a threading attachment for drill presses.

Heretofore with tools of this character it has been impossible to make perfect internal threads in bore holes due to varying pressures on the tap used for such purpose.

It is, therefore, a principal object of the present invention to provide a device for exerting equal pressure on the tap of a drill press so that perfect threads may be made by said device.

Other objects of the invention are to provide a drill press or machine of that type with a chaser for controlling movement of a die for making internal threads in bore holes; to provide a means for equalizing and controlling movement of the die in drill presses; to provide a resilient bushing for a die for regulating pressure on the die; and to provide a device applicable for precision tapping which is simple, efficient and economical to manufacture.

In accomplishing these and other objects of the invention, I have provided improved details of structure, the preferred form of which is illustrated in the accompanying drawings wherein:

Fig. 1 is a perspective view of a drill press embodying the features of my invention.

Fig. 2 is a cross sectional view of the tap carrying shaft held on the supporting arm by an internally threaded bushing.

Fig. 3 is a plan view of the threaded shaft with the threaded bushing mounted on the bearing of the supporting arm.

Fig. 4 is a detailed perspective view of the threaded shaft, bushings and nut carried by the bearing on the arm, the parts being shown in disassembled relation.

Fig. 5 is a cross sectional plan view of the clamp carrying the arm.

Referring more in detail to the drawings:

1 designates a conventional drill press comprising a frame 2 carried by a standard 3 mounted on the usual base 4. A work table 5 is vertically adjustable on the standard relative to the frame by a screw 6 operable by a handle 7. Mounted on the frame 2 and contained in a housing 8 is a reversibly rotating clutch mechanism for rotating a shaft 9. The clutch is driven by a motor 10 through a belt or gear mechanism contained in the housing 11.

Mounted on the standard 3 by a clamp 12 is an arm 13 provided at its outer end with a cylindrical bearing 14. The bearing 14 is tapered upwardly as indicated at 15, Fig. 2, for a purpose later described. Located within the bearing 14 is a split bushing 16 having tapered sides 17 adapted to fit the tapered sides 15 of the bearing 14. The split bushing is provided with internal threads 18 and is externally threaded on each side of the tapered side 17 as indicated at 19 and 20. The bushing 16 is held in place in the bearing 14 by internally threaded nuts 21 and 22 threaded on the bushing 16 on each side of the bearing 14.

The shaft 9 is provided with external threads 23 cooperating with the internal threads 18 on the bushing 16 when the shaft is carried by the arm 13. The upper end of the shaft 9 is connected to the reversely located clutch mechanism by a chuck 24. The lower end of the shaft 9 is provided with a socket 25 adapted to receive a threading tap 26. The threading tap is secured to the lower end of the shaft 9 by a chuck 27. The threads 23 on the shaft 9 conform to the threads 40 on the tap 26, for a purpose later described.

The arm 13 is adjustable on the column 3 by the clamp 12 pivoted at 28 and is provided on its opposite sides by outwardly extending flanges 29 and 29', the flange 29 having a screw threaded opening 30 adapted to receive a screw threaded pin 31 through an opening 32 in the flange 29'. The pin 31 is provided with a handle 33 for tightening or loosening the clamp on the column 3 for adjustment of the arm 13.

The split bushing 18 is also grooved on the opposite side from the slit 34 as indicated at 35 to provide flexibility of the bushing. When the bushing 16 is placed in the bearing 14, the tapered side 17 of the bushing will cooperate with the tapered side 15 of the bearing. When the nuts 21 and 22 are screwed on to the respective ends of the bushings, the shoulders 36 and 37 will bear against the respective sides of the bearings as indicated at 38 and 39, Fig. 2. By adjustment of the nuts 21 and 22 any wear between the threads of the bushing and the threads of the shank may be eliminated. For instance, loosening of the nut 22 and tightening of the nut 21 will cause upward pressure on the tapered bearing, thus exerting pressure against the tapered side 17 of the bushing 16 to cause snug fit of the threaded shaft 3 in said bushing. If it is desired to loosen the adjustment between the bushing and threaded shaft, the opposite procedure is followed, i. e., loosening of the nut 21 and tightening of the nut 22 will cause downward pressure on the sides of the bushing 14 to relieve the pressure on the tapered side 17 of the bushing 16.

Operation of the device constructed and assembled as described is as follows:

The arm 13 is adjusted on the column 3 by the pivoted clamp 12 to the desired position so that the bearing 14 will be in axial alignment with the reversely rotating clutch. The work table 5 is then adjusted for proper height according to the article placed thereon in which the internal threads are to be cut in a bore opening so that it is properly situated in relation to the tap 26. Manipulation of the handle 41 will cause the clutch to rotate in one direction to cause the threaded shaft 9 to rotate in the threaded bushing 16 until the desired depth of thread is accomplished in the article worked upon, and then by reverse turning of the handle 41 the tap 26 is removed from the threaded opening.

The external threads 23 on the shaft 9 conform to the threads 40 on the tap 26 and adjustment of the resilient bushing 17 in the bearing 14 so that an even pressure will be exerted at all times on the shaft 9 a substantially perfect thread will be made in the articles being worked upon. With the arrangement thus described, the tap 26 can only enter the bore opening as fast as and according to the external screw threads on the shaft 9.

The longitudinal groove in the bushing provides flexibility of the bushing relative to the shaft so that the bushing may be adjusted to take up any wear in the external threads on the shaft and the internal threads on said bushing.

It will thus be seen that my invention furnishes a means whereby positive and accurate thread lead may be obtained on a drill press equipped with a friction tapper as shown and described or on drill presses with reversing motor.

From the foregoing it is apparent, therefore, that I have provided improved details of structure for an attachment for drill presses which is simple, economical to manufacture, and one which will obtain a result not obtainable with devices heretofore constructed.

What I claim and desire to secure by Letters Patent is:

1. A device of the character described comprising, a standard, a frame supported on said standard, an arm mounted on said standard, a cylindrical bearing on the outer end of the arm, said bearing having tapered inner side walls, an internally threaded split bushing having its outer side walls tapered to conform to the inner walls of said bearing, a longitudinal groove in one side of said bushing, external threads on the outer ends of said bushing for receiving internally threaded nuts to hold said bushing on said bearing, an externally threaded shaft threaded into said bushing, a threaded tap carried by the lower end of said shaft, and means on the standard for rotating said shaft.

2. A device of the character described comprising, a standard, a frame supported on said standard, a reversible rotating clutch carried by said frame, an arm mounted on said standard, a cylindrical bearing on the outer end of the arm, said bearing having tapered inner side walls, an internally threaded bushing having its outer side walls tapered to conform to the inner wall of said bearing, a longitudinal groove in one side of said bushing, external threads on the outer ends of said bushing for receiving internally threaded nuts to hold said bushing on said bearing, an externally threaded shaft threaded into said bushing, a threaded tap carried by the lower end of said shaft, means connecting the upper end of said shaft to said clutch, and means for rotating said shaft.

3. A device of the character described comprising, a standard, a frame supported on said standard, a reversible rotating clutch carried by said frame, an arm adjustably mounted on said standard, a cylindrical bearing on the outer end of said arm, said bearing having tapered inner side walls, an internally threaded split bushing having its outer side walls tapered to conform to the inner wall of said bearing, a longitudinal groove in one side of said bushing, external threads on the outer ends of said bushing for receiving internally threaded nuts to hold said bushing on said bearing, an externally threaded shaft threaded into said bushing, a threaded tap carried by the lower end of said shaft, means connecting the upper end of said shaft to said clutch, and means for rotating said shaft.

4. A device of the character described comprising, a standard, a frame supported on said standard, a reversible rotating clutch carried by said frame, an arm mounted on said standard, a cylindrical bearing on the outer end of said arm, said bearing having tapered inner side walls, an internally threaded resilient bushing having its outer side walls tapered to conform to the inner wall of said bearing, a longitudinal groove in one side of said bushing, external threads on the outer ends of said bushing for receiving internally threaded nuts to hold said bushing on said bearing, an externally threaded shaft threaded into said bushing, a threaded tap carried by the lower end of said shaft, means connecting the upper end of said shaft to said clutch, and means for rotating said shaft.

5. A device of the character described comprising, a standard, a frame supported on said standard, an arm mounted on said standard, a cylindrical bearing on the outer end of said arm, said bearing having tapered inner side walls, an internally threaded flexible bushing having its outer side walls tapered to conform to the inner walls of said bearing, a longitudinal groove in one side of said bushing, external threads on the outer ends of said bushing for receiving internally threaded nuts to hold said bushing on said bearing, an externally threaded shaft threaded into said bushing, a threaded tap carried by the lower end of said shaft, and means on the frame for rotating said shaft.

6. A device of the character described comprising, a standard, a frame supported on said standard, an arm adjustably mounted on said standard, a tubular bearing on the outer end of said arm, said bearing having tapered inner side walls, an internally threaded flexible bushing having its outer side walls tapered to conform to the inner walls of said bearing, an externally threaded shaft engaging in said bushing, a threaded tap carried by the lower end of said shaft, means for adjusting said bushing relative to said shaft, and means on the frame for rotating said shaft.

7. A device of the character described comprising, a standard, a frame supported on said standard, an arm adjustably mounted on said standard, a tubular bearing on the outer end of said arm, said bearing having tapered inner side walls, an internally threaded flexible bushing having its outer side walls tapered to conform to the inner walls of said bearing, an externally threaded shaft engaged in said bushing, a threaded tap carried by the lower end of said shaft, means for adjusting said bushing relative to said shaft, said threads on said tap conforming to the external threads on said shaft, and means on the frame for rotating said shaft.

8. A threading attachment for a drill press including an arm adapted for attachment to the drill press, a tubular head on the arm having a tapered inner side wall, an internally threaded bushing having an outer tapered side wall engaging the tapered inner side wall of the tubular head, means on the ends of the bushing for retaining the bushing in said head, and an externally threaded shaft engaged in said bushing, said shaft having a tapered socket in one end adapted for mounting the shank of a tap retaining chuck.

9. A threading attachment for a drill press including an arm adapted to be adjustably supported on the drill press, a tubular head on the arm having a tapered inner side wall, an internally threaded bushing having its outer side tapered to conform to the taper of the inner wall of the tubular head, said bushing having threaded ends projecting from opposite sides of the head, adjusting nuts on the threaded ends of the bushing, an externally threaded shaft engaging in the internal threads of the bushing, means on one end of the shaft for connecting a tap, and means on the other end of the shaft for connecting the operating mechanism of the drill press.

10. A threading attachment for a drill press including an arm adapted to be adjustably supported on the drill press, a tubular head on the arm having a tapered inner side wall, an internally threaded split bushing having its outer side tapered to conform to the taper of the inner wall of the tubular head, said bushing having threaded ends projecting from opposite sides of the head, adjusting nuts on the threaded ends of the bushing, an externally threaded shaft engaging in the internal threads of the bushing, means on one end of the shaft for connecting a tap, and means on the other end of the shaft for connecting the operating mechanism of the drill press.

11. A threading attachment for a drill press including an arm adapted to be adjustably supported on the drill press, a tubular head on the arm having a tapered inner side wall, an internally threaded split bushing having its outer side tapered to conform to the taper of the inner wall of the tubular head, said bushing having threaded ends projecting from opposite sides of the head, adjusting nuts on the threaded ends of the bushing, an externally threaded shaft engaging in the internal threads of the bushing, means on one end of the shaft for connecting a tap, and means on the other end of the shaft for connecting the operating mechanism of the drill press, said bushing having a groove substantially opposite the slot thereof.

WILLIAM C. GLOVER, JR.